(12) United States Patent
Brockway et al.

(10) Patent No.: US 12,492,839 B2
(45) Date of Patent: Dec. 9, 2025

(54) TEMPERATURE AND RELATIVE HUMIDITY CONTROLLER

(71) Applicant: Nelumbo Inc., Hayward, CA (US)

(72) Inventors: Lance R. Brockway, Hayward, CA (US); David C. Walther, Hayward, CA (US); James Ma, Hayward, CA (US)

(73) Assignee: NELUMBO INC., Hayward, CA (US)

( * ) Notice: Subject to any disclaimer, the term of this patent is extended or adjusted under 35 U.S.C. 154(b) by 0 days.

(21) Appl. No.: 18/544,123

(22) Filed: Dec. 18, 2023

(65) Prior Publication Data

US 2024/0175598 A1 May 30, 2024

Related U.S. Application Data

(62) Division of application No. 17/890,652, filed on Aug. 18, 2022, now Pat. No. 11,879,657, which is a
(Continued)

(51) Int. Cl.
*F24F 11/74* (2018.01)
*F24F 11/41* (2018.01)
(Continued)

(52) U.S. Cl.
CPC .............. *F24F 11/74* (2018.01); *F24F 11/41* (2018.01); *F24F 11/46* (2018.01); *F24F 11/873* (2018.01);
(Continued)

(58) Field of Classification Search
CPC .. F24F 11/74; F24F 11/41; F24F 11/46; F24F 11/873; F24F 13/22; F24F 13/04
See application file for complete search history.

(56) References Cited

U.S. PATENT DOCUMENTS 4,903,503 A * 2/1990 Meckler ................ F24F 3/1417
62/332
4,987,748 A * 1/1991 Meckler ................ F24F 5/0089
62/271
(Continued)

FOREIGN PATENT DOCUMENTS

CN 1714259 A 12/2005
CN 91575646 9/2010
(Continued)

OTHER PUBLICATIONS

Aili, A., et al., Characteristics of Jumping Droplet-Enhanced Condensation on Nanostructured Micromesh Surface, 2016, ASME 2016 5th International Conference on Micro/Nanoscale Heat and Mass Transfer, V 001T004A001.
(Continued)

*Primary Examiner* — Nelson J Nieves
(74) *Attorney, Agent, or Firm* — Jill A. Jacobson; Fountainhead Law Group, PC

(57) ABSTRACT

Control systems are provided that provide thermodynamically decoupled control of temperature and relative humidity and/or reduce or prevent frost formation or remove previously-formed frost. The control systems herein may be included as a component of a heating, ventilation, air conditioning, and refrigeration system that includes a heat exchanger.

13 Claims, 6 Drawing Sheets

Related U.S. Application Data division of application No. 16/477,862, filed as application No. PCT/US2018/013228 on Jan. 11, 2018, now Pat. No. 11,473,807.

(60) Provisional application No. 62/445,434, filed on Jan. 12, 2017.

(51) Int. Cl.

| | | |
|---|---|---|
| F24F 11/46 | (2018.01) | |
| F24F 11/873 | (2018.01) | |
| F24F 13/22 | (2006.01) | |
| F28F 13/04 | (2006.01) | |
| F24F 110/10 | (2018.01) | |
| F24F 110/20 | (2018.01) | |
| F24F 110/30 | (2018.01) | |
| F24F 140/60 | (2018.01) | |

(52) U.S. Cl.
CPC ............. *F24F 13/22* (2013.01); *F28F 13/04* (2013.01); *F24F 2013/221* (2013.01); *F24F 2110/10* (2018.01); *F24F 2110/20* (2018.01); *F24F 2110/30* (2018.01); *F24F 2140/60* (2018.01)

(56) References Cited

U.S. PATENT DOCUMENTS

| | | | |
|---|---|---|---|
| 5,775,121 A * | 7/1998 | Kuma | F24F 5/0007 62/121 |
| 6,158,230 A | 12/2000 | Katsuki | |
| 6,427,454 B1 | 8/2002 | West | |
| 8,540,889 B1 | 9/2013 | Hartlove et al. | |
| 9,147,633 B2 | 9/2015 | Eid et al. | |
| 9,362,201 B2 | 6/2016 | Gavillet et al. | |
| 2003/0074913 A1* | 4/2003 | Ebara | F24F 1/0038 62/271 |
| 2004/0035561 A1* | 2/2004 | Ko | F28D 1/0477 165/151 |
| 2004/0055892 A1 | 3/2004 | Oh et al. | |
| 2004/0089015 A1 | 5/2004 | Knight et al. | |
| 2004/0118698 A1 | 6/2004 | Lu et al. | |
| 2006/0026976 A1 | 2/2006 | Carpenter | |
| 2006/0086121 A1* | 4/2006 | Wiggs | F25D 21/04 62/515 |
| 2006/0090507 A1 | 5/2006 | Taras et al. | |
| 2006/0141268 A1 | 6/2006 | Kalkan et al. | |
| 2006/0150644 A1* | 7/2006 | Wruck | F24F 11/74 62/126 |
| 2007/0205297 A1* | 9/2007 | Finkam | F24F 11/30 236/1 C |
| 2009/0277193 A1 | 11/2009 | Springer et al. | |
| 2010/0099012 A1 | 4/2010 | Adzic | |
| 2010/0203287 A1 | 8/2010 | Jiang et al. | |
| 2011/0198059 A1 | 8/2011 | Gavillet et al. | |
| 2011/0253007 A1 | 10/2011 | Zastrau et al. | |
| 2012/0111549 A1* | 5/2012 | Fukuta | F28F 13/185 165/177 |
| 2012/0231290 A1 | 9/2012 | Ho et al. | |
| 2013/0037172 A1 | 2/2013 | Garcia-Juan et al. | |
| 2013/0244001 A1 | 9/2013 | Wang et al. | |
| 2013/0330501 A1 | 12/2013 | Aizenberg et al. | |
| 2014/0011013 A1 | 1/2014 | Jin et al. | |
| 2014/0017456 A1 | 1/2014 | Xiao et al. | |
| 2014/0182790 A1* | 7/2014 | Hwang | F28F 19/00 205/109 |
| 2014/0208978 A1 | 7/2014 | Sunder et al. | |
| 2014/0231052 A1 | 8/2014 | Takasawa et al. | |
| 2014/0238645 A1* | 8/2014 | Enright | F28F 13/187 427/272 |
| 2014/0238646 A1 | 8/2014 | Enright | |
| 2014/0247556 A1 | 9/2014 | Eid et al. | |
| 2015/0107817 A1* | 4/2015 | Douglas | F24F 11/62 454/238 |
| 2015/0300673 A1* | 10/2015 | Dodds | F24F 11/30 236/44 A |
| 2015/0323216 A1* | 11/2015 | Wallin | F28D 9/0031 165/41 |
| 2015/0344734 A1* | 12/2015 | Hanich | C03C 17/30 524/588 |
| 2015/0370927 A1* | 12/2015 | Flaherty | F24F 11/30 703/1 |
| 2016/0068703 A1 | 3/2016 | Schmidt et al. | |
| 2016/0091255 A1* | 3/2016 | Bastian | F28F 11/04 165/86 |
| 2016/0097606 A1 | 4/2016 | Xiao et al. | |
| 2016/0178222 A1 | 6/2016 | Bush et al. | |
| 2016/0209125 A1* | 7/2016 | Hanlon | F28D 1/0477 |
| 2017/0153037 A1* | 6/2017 | Goel | F25B 41/42 |
| 2017/0227860 A1* | 8/2017 | Eri | G03G 9/09716 |
| 2017/0234629 A1* | 8/2017 | Schmidt | F25B 13/00 62/498 |
| 2017/0282416 A1* | 10/2017 | Kim | B29C 59/005 |
| 2018/0135926 A1* | 5/2018 | Tanda | F28F 19/002 |
| 2019/0331346 A1* | 10/2019 | Kawashima | F25D 17/02 |

FOREIGN PATENT DOCUMENTS

| | | | |
|---|---|---|---|
| CN | 102748987 A | 10/2012 | |
| CN | 103017332 A | 4/2013 | |
| CN | 103173832 A | 6/2013 | |
| CN | 103575004 A | 2/2014 | |
| CN | 104096459 A | 10/2014 | |
| CN | 104451814 A | 3/2015 | |
| CN | 106196421 A | 12/2016 | |
| EP | 2752504 A1 | 7/2014 | |
| EP | 3059541 A1 | 8/2016 | |
| JP | 2000-356481 A2 | 12/2000 | |
| JP | 2000356481 A * | 12/2000 | ............ F24F 3/1423 |
| WO | WO2010131257 A2 | 11/2010 | |
| WO | WO2014012052 A1 | 1/2014 | |
| WO | WO2017031391 A1 | 2/2017 | |
| WO | WO2018053452 A1 | 3/2018 | |
| WO | WO2018053453 A1 | 3/2018 | |
| WO | WO2018132519 A1 | 7/2018 | |

OTHER PUBLICATIONS

Kang, S.M., et al., Directional Oil Sliding Surfaces with Hierarchical Anisotropic Groove Microstructures, Aug. 5, 2013, Adv. Mater. 25(40):5756-5671.

Lv, Y., et al., Fabrication of Superhydrophobic Films on Aluminum Foils with Controllable Morphologies, Jan. 11, 2013, Adv. Mat. Res. 641-642:414-417.

Miljkovic, N., et al., Condensation heat transfer on superhydrophobic surfaces, 2013, MRS Bull. 38:397-406.

Miljkovic, N., et al., Jumping-Droplet-Enhanced Condensation on Scalable Superhydrophobic Nanostructured Surfaces, 2013, Nano Lett., 13(1):179-187.

Miljkovic, N., et al., Modeling and Optimization of Superhydrophobic Condensation, 2013, J. Heat Transf.-Trans., ASME 135:14.

Mozalev, A., et al., The superhydrophobic properties of self-organized microstructured surfaces derived from anodically oxidized Al/Nb and Al/Ta metal layers, 2012, Electrochimica Acta 82:90-97.

Tuteja, A., et al., Design Parameters for Superhydrophobicity and Superoleophobicity, Jan. 1, 2011, MRS Bulletin 33(8):752-758.

Wang, Z., et al., In situ growth of hierarchical boehmite on 2024 aluminum alloy surface as superhydrophobic materials, 2014, RSC Adv. 4:14708-14714.

Zhao, J., et al., CoMn-layered double hydroxide nanowalls supported on carbon fibers for high-performance flexible energy storage devices, 2013, J. Mater. Chem. A, 1:8836-8843.

* cited by examiner

TEMPERATURE AND RELATIVE HUMIDITY CONTROLLER

CROSS-REFERENCE TO RELATED APPLICATIONS

This application is a divisional of U.S. application Ser. No. 17/890,652, filed Aug. 18, 2022, which is a divisional of U.S. application Ser. No. 16/477,862, filed Jul. 12, 2019, now U.S. Pat. No. 11,473,807, issued Oct. 18, 2022, which is a U.S. national phase application under 35 U.S.C. 371 of PCT/US2018/013228, filed on Jan. 11, 2018, which claims the benefit of U.S. Provisional Application No. 62/445,434, filed Jan. 12, 2017, which is incorporated by reference herein in its entirety.

FIELD OF THE INVENTION

The invention relates to control systems for thermodynamically decoupled control and maintenance of temperature and relative humidity, for example, in conjunction with an HVAC system.

BACKGROUND

Current controllers for heating, ventilation, and air conditioning (HVAC) systems are controlled thermostatically and operate based on thermodynamic equilibrium. These thermostats control the temperature as it is coupled to the relative humidity by physical laws. These thermostats allow the user to set a desired area temperature, and if the temperature drops too far below this setpoint, the room will be heated. Alternatively, if the temperature rises too far above this setpoint, the room will be cooled. Cooling of the air is largely controlled by the removal of humidity through a condensation process which occurs within the HVAC units. In certain interior environments and climates, the thermodynamic coupling of humidity to this thermostatic temperature control is problematic. For example, when cooling dry air in a desert environment, moisture will also be removed, further drying the air and resulting in an uncomfortable living environment. Often in this case, separate pieces of hardware (humidifiers) will be added to solve this problem. Some specialty applications, such as server rooms and electronic assembly areas could greatly benefit from the ability to control the relative humidity as electrostatic discharge is much more common in dry environments that occur when indoor air is cooled.

Additional methods for temperature control can be carried out with evaporative coolers. In these systems, moisture is added to low humidity air. The air is cooled adiabatically along a line of constant enthalpy. The resulting air has an increased humidity and reduced dry bulb temperature.

In addition to the thermostatic (primary) controllers, modern heating, ventilation, air conditioning, and refrigeration (HVAC-R) systems may include sensors for determining inefficient operating conditions such as frost formation. Furthermore, usage, weather, spatial and temporal data may be used to manage the operating conditions of HVAC-R systems including operating duty cycles and operation of defrost cycles. Some modern HVAC-R systems also vary the heat duty of exchangers through variable refrigerant flow.

HVAC-R systems coated with hydrophobic materials cause the water to bead on the surface. As the air is pushed across the cooling surface by the fan, the droplets are also dragged across the surface and into a collection pan. Inevitably, some of these droplets will become entrained into the air stream and revaporize, resulting in a decrease in temperature of the air stream and an increase in humidity. For typical uncoated systems, hydrophilic coated systems, and hydrophobic coated systems, this droplet revaporization is negligible.

Refrigeration systems need to periodically defrost the evaporator coil, which results in increased energy consumption, equipment downtime, increased equipment cost, and increases in the temperature of the products to be cooled. For blast chilling and freezing systems, this often requires to the system to stop in the middle of the chilling cycle to defrost the cooling coil. This reduces throughput and results in a reduction in quality for the chilled/frozen product.

Improved methods and systems for controlling temperature and humidity, and for chilling materials, are needed.

BRIEF SUMMARY OF THE INVENTION

Control systems and methods of use of the control systems to independently control (e.g., provide thermodynamically decoupled control of) temperature and relative humidity, for example, in a room or an environment, and/or to reduce or prevent frost formation or to remove previously-formed frost, e.g., in a device such as a heat exchanger, for example, as a component of a HVAC or HVAC-R system, are provided.

In one aspect, a control system is provided that provides thermodynamically decoupled control of relative humidity and temperature in a system such as a heating, ventilation, air conditioning, and refrigeration (HVAC-R) system, e.g., an HVAC-R system that comprises a heat exchanger. In one embodiment, the HVAC-R system includes a heat exchanger, and the independent (thermodynamically decoupled) control includes varying the air velocity through the heat exchanger. In some embodiments, the independent (thermodynamically decoupled) control at least partially includes jumping droplet condensation on at least one surface of the HVAC-R system, for example, on at least one surface of a heat exchanger through which the air travels. In some embodiments, the jumping droplet condensation occurs on a nanostructured composition or layer. In one embodiment, the jumping droplet condensation occurs on a nanostructured composition or layer on a structure such as a fin structure, for example, a fin structure that comprises or consists of aluminum or an aluminum alloy.

In some embodiments, the control system reduces or eliminates frost and/or prevents frost formation. In some embodiments, the independent (thermodynamically decoupled) control includes varying the air velocity through the heat exchanger such that the air velocity is greater than the critical air velocity for frost formation, thereby preventing the formation of frost. In some embodiments, during at least a portion of the time that the control system is in operation, the air velocity through the heat exchanger is increased to a value greater than the critical air velocity for frost formation, thereby removing frost that formed previously to operation of the control system. For example, in some embodiments, critical air velocity is about 1 to about 20 m/s, e.g., about 3 m/s, for air with relative humidity of 0% to about 100%, about 40% to about 80%, e.g., about 60%, and temperature of about 0)° ° C. to about 60° C., about 5° C. to about 40° C., about 10° C. to about 30° C., or about 15° C. to about 25° C. In some embodiments, the heat exchanger includes a coating composition on at least one surface of the heat exchanger through which air travels, and the onset of frost formation is reduced relative to an uncoated system, thereby preventing formation of frost. In some embodiments, the independent (thermodynamically decoupled) control at least partially includes jumping droplet condensation on at least one surface of the HVAC-R system, for example, on at least one surface of a heat exchanger through which the air travels. In some embodiments, the jumping droplet condensation occurs on a nanostructured composition or layer.

In another aspect, a controller is provided that decouples (e.g., independently controls) the control of relative humidity and temperature. In some embodiments, the controller increases efficiency and/or reduces energy usage through decreased runtime in comparison to a system in which relative humidity and temperature are not independently controlled (thermodynamically decoupled). In some embodiments, the controller establishes a desired comfort setting for occupants of an environment that is exposed to the resultant process fluid, for example, temperature and humidity controlled air. In some embodiments, the control of relative humidity and temperature includes jumping droplet condensation, for example, on a surface of a heat exchanger, e.g., a surface with a coating layer such as a nanostructured coating composition or layer. In some embodiments, the controller controls a first setpoint for temperature and a second setpoint for humidity, for example, in an HVAC-R system.

In another aspect, a coating composition is provided. When deposited on an air-side surface of a heat exchanger, the composition causes a change on the tube-side temperature, pressure, and/or capacity for heat transfer in the heat exchanger. In some embodiments, the coating is nanostructured. In some embodiments, the coating promotes an increased condensate rejection rate in comparison to a surface that does not include the coating composition. For example, the increased condensate rejection rate may include jumping droplet condensation or droplet ejection.

In another aspect, a heat exchanger is provided that includes a coating composition as described herein on at least one air-side surface.

In another aspect, a controller is provided for a heat exchanger that includes an air-side and a tube-side, wherein the controller varies the tube-side temperature, pressure, and/or capacity for heat transfer, for example, in an HVAC or HVAC-R system. In one embodiment, the controller modulates cooling capacity of an HVAC or HVAC-R system. In some embodiments, the controller modulates a variable frequency compressor, e.g., an inverter. In some embodiments, control of the tube-side conditions in the heat exchanger includes a change in the air-side heat transfer rate. In some embodiments, at least one air-side surface of the heat exchanger includes a coating or surface modification, and the air-side heat transfer rate is increased by an increased rate of condensate rejection in comparison to a heat exchanger that does not include the air-side coating or surface modification. For example, the increased rate of condensate rejection may include jumping droplet condensation or droplet ejection. In some embodiments, jumping droplet condensation or droplet ejection on at least one air-side surface of the heat exchanger may be promoted by a coating or surface modification on the air-side heat transfer surface. For example, the coating or surface modification may include a nanostructured composition. In an embodiment, the heat exchanger surface that includes a coating or surface modification, e.g., a nanostructured coating composition or layer, comprises or consists of aluminum or an aluminum alloy.

In another aspect, a controller is provided that controls air velocity and coolant temperature, pressure, and/or capacity to achieve a desired decoupled (e.g., independently controlled) air temperature and air humidity output condition in an HVAC or HVAC-R system.

In another aspect, methods and systems are provided to achieve frost-free blast chilling and or reduced-frost blast freezing by using droplet ejection surface modified evaporator coils and thermal control of the coil temperature as part of the refrigeration system. Droplet ejection coatings are able to suppress frost formation below the freezing point of water. This provides completely or substantially frost free blast chillers and blast freezers with fewer defrosts when operated in a prescribed manner. Droplet ejection surface modifications reduce the rate of frost formation or prevent the formation of frost altogether (FIG. 7).

The refrigeration system can be operated under several possible modes, (a) cooling: (b) freezing: or consecutive modes (a)+(b). Under cooling mode (a), the refrigeration system will operate at a temperature sufficient to rapidly chill products and remain above the temperature for onset of frost formation on the evaporator coil. Due to the droplet ejection surface modification, the coil can maintain temperatures below 0° C., about 0° C. to about −25° C., about −5° C. to about −10° C., or any of about −5° C., about −10° C., about −15° C., about −20° C., or about −25° C., without frost formation on the coil. In some embodiments, the operation of the system occurs within the temperature and air velocity range depicted in FIG. 7. Operation in this range allows for the rapid chilling of products without frost formation on the coil and the commensurate defrosting related problems.

When operating in freezing mode (b), the refrigeration system lowers the coil temperature to rapidly freeze the products until the desired set point is achieved. By initially operating in refrigeration mode (a) outlined above and transitioning into freezing mode (b), the air will be dehumidified and the vapor pressure of water will be reduced. When operating in these consecutive cooling and freezing modes (a)+(b), the frost formation is minimized via the previous dehumidification in the chilling mode, with condensate drainage instead of frost formation. The result of operation in these consecutive modes is an increased throughput of chilled product for a given refrigeration system. For example, throughput may be increased at least about 10% or at least about 20%.

These two techniques reduce frost formation which improves coil and system performance and improves the throughput of chilled products through a refrigeration system.

DETAILED DESCRIPTION

Figure 1:
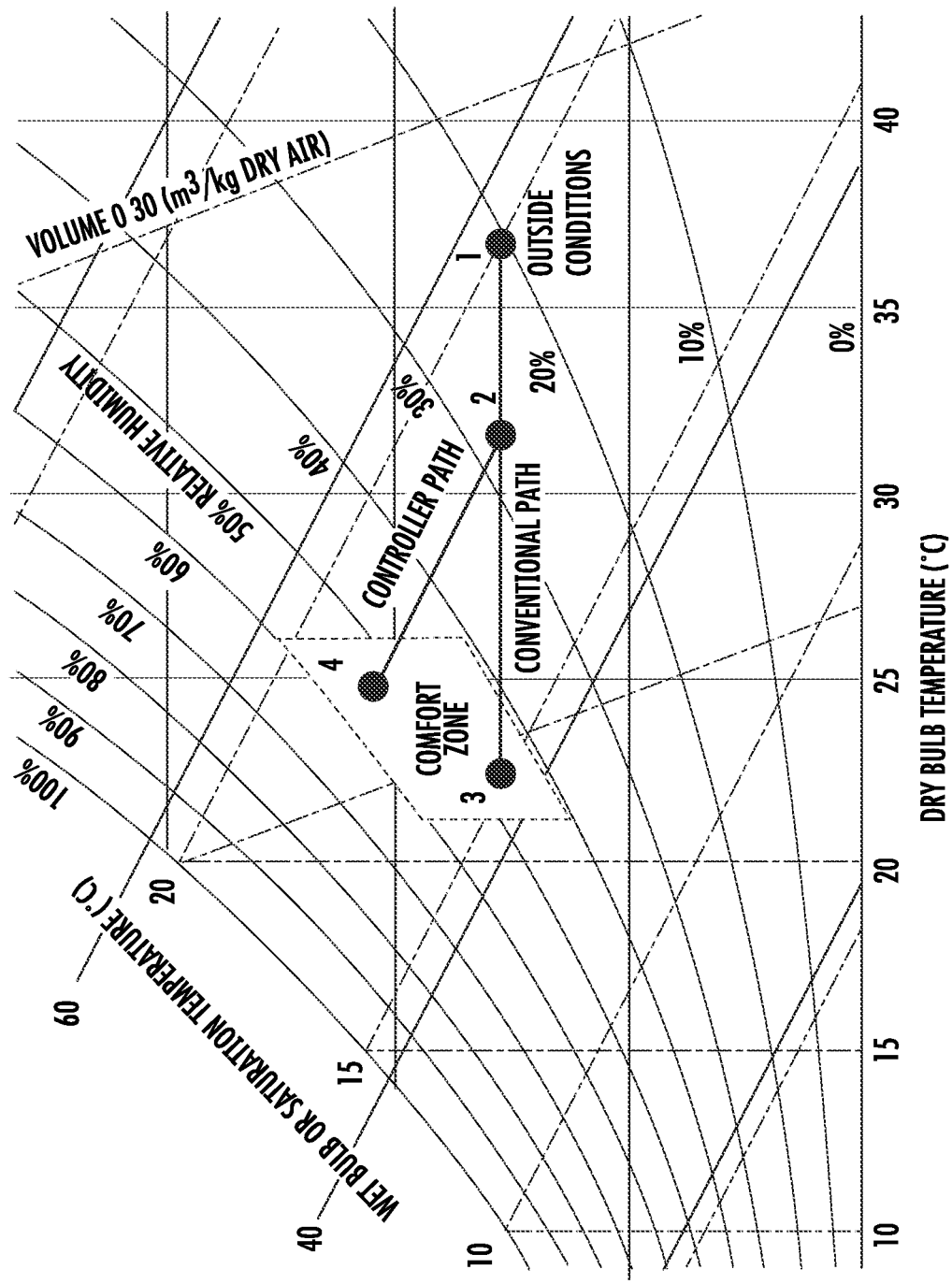
FIG. 1 depicts controller versus conventional cooling paths in an HVAC-R system in a hot and dry environment.

Control systems and controllers are provided that independently regulate temperature and relative humidity, for example, in an HVAC or HVAC-R system. Temperature and relative humidity are thermodynamically decoupled in the systems described herein.

Superhydrophobic materials are known that allow droplets to eject or "jump" from the surface at a very small size, which can increase the quantity of entrained droplets by many orders of magnitude in comparison to unmodified, hydrophilic or hydrophobic surfaces. Entrained liquid from these latter surfaces comes about from large turbulence or shedding actions. The resultant droplets are large and revaporization rates are limited. In contrast, on certain superhydrophobic surfaces, very large numbers (e.g., millions) of droplets per second are entrained and carried downstream. Additionally, these droplets are small enough to quickly revaporize and transfer the latent heat to cool the air while simultaneously increasing the humidity. Such materials are described herein in relation to heat exchange and consequent control of temperature and relative humidity (RH).

The quantity of droplets jumping or ejecting from the surface to become entrained is a function of the air velocity in a heat exchanger. By controlling the face velocity across the exchanger, the amount of revaporization can be controlled, thus allowing for a range of independent temperature and RH options, instead of the coupled temperature and RH control offered by current thermostatic systems. Additionally, controlling the degree of condensation driving force through the difference in temperature between the refrigerant (tube side) and air side (fin side) in a heat exchanger will affect the degree of droplet ejection and revaporization. This may be achieved in a variety of ways, including but not limited to, refrigerant flow rate, refrigerant temperature via control of compressor (refrigerant pressure), and/or airflow as noted above.

In some embodiments, the change in face velocity and latent degradation phenomenon described herein is promoted by a coating composition that causes a shift in the tube-side equilibrium in the heat exchanger. In some embodiments, the coating composition includes a nanostructured material. In some embodiments, the nanostructured material promotes droplet ejection from the surface. A significant increase in the air-side heat transfer coefficient can greatly increase the capacity of a heat exchanger, and consequently, an increase in capacity of the tube-side will also be required. This can be accomplished by a variable capacity compressor such as an inverter compressor.

This new coupling of air velocity, air cooling capacity, and consequential tube-side capacity requires novel control systems to maximize the functionality of the coated HVAC-R system and to maximize its efficiency of operation. A schematic of an example control system is shown in FIG. 3.

In certain embodiments, the conditions of the incoming air and fin temperature lead to the formation of frost from the condensate on the exchanger. This frost formation limits the heat transfer from the evaporator, reducing the amount of useful cooling from the device, and further, increases the pressure drop across the evaporator coils, which adversely affects energy efficiency.

In certain embodiments, with a nanostructured coating applied as described herein, we have surprisingly shown that at certain velocities in which frost formation readily occurred on materials without nanostructured coatings (i.e., velocities obtainable in a typical HVAC system), frost formation was not observed. An example of this phenomenon is shown in FIG. 4. Condensation was observed to continue in the unfrozen regions.

In certain embodiments, an HVAC-R system design is provided in which the design air velocity is greater than the critical air velocity for a particular nanostructured surface, in which the onset of frost formation is severely retarded or even prevented altogether. In certain embodiments, it is desirable that the velocity across the surface shall be minimized to limit pressure drop and potential noise generation.

Surprisingly, we have also observed that changing air velocity alone was sufficient to defrost samples that had a nanostructured coating applied. In this scenario, a sample was subjected to conditions which led to frost formation. At this point, the air velocity was increased, and the frost which had formed under the previous conditions was removed to liquid water, and removed from the sample.

In some embodiments, a HVAC-R control system design is provided in which the primary operating air velocity may lead to conditions in which frost formation may occur in a prescribed or otherwise controlled manner, and the primary air velocity is increased to remove any potential frost formation and to prevent the additional formation of frost and the commensurately deleterious outcomes. The periods of increased velocity may be relatively frequent to prevent frost formation and to prevent heat transfer fouling by frost, or may be relatively infrequent to remove frost which has formed.

Air velocity may be modulated by fan speed, pitch, or proximity, bypass venting, baffling or dampers (the latter being the case for an inlet cooler for a turbine in which the turbine is downstream and is the prime mover of the process fluid (air), and velocity may be changed by affecting damper position on the front end).

Definitions

"A," "an" and "the" include plural references unless the context clearly dictates otherwise.

A "nanostructured" coating refers to a coating composition that has a feature in at least one dimension that is less than 100 nanometers.

"Non-condensing gases" or "NCGs" refers to gasses that do not change phase at the desired condensing conditions of a vapor. Oxygen and nitrogen, for example, are NCGs when air is being dehumidified.

"Condensing conditions" refers to a condition wherein a surface is cooled below the dewpoint of a vapor.

"Supersaturation" refers to a condition when the vapor pressure of a vapor is above the equilibrium vapor pressure at a given temperature and pressure. A supersaturation of 1 refers to a relative humidity of 100% and any further increase promotes condensation.

"Ejection," in reference to droplets of liquid, refers to leaving a surface with a velocity that has a non-zero normal component.

"Surface tension" refers to the tension of a liquid surface caused by cohesive forces in the bulk of the liquid that pulls inward toward the bulk and tends to minimize the surface area for a given volume.

"Droplet adhesion forces" refers to the forces responsible for causing a droplet to pull outward and spread on a surface, thus preventing it from forming a sphere. Contrarily, "cohesive forces" are those forces that cause a droplet to pull itself inward and form a sphere, such as surface tension.

"Refrigerant" refers to a substance or mixture used in a refrigeration cycle as the working fluid. This fluid often goes through phase changes, but need not to be effective. Commercial refrigerants include, but are not limited to R-22, R-134a, R-401 and other formulations. A nonlimiting list of refrigerants can be found at https://en.wikipedia.org/wiki/List_of_refrigerants.

"Working fluid" refers to a liquid or gas that absorbs or transmits energy. For example, the working fluid in an air conditioner system is the coolant such as Freon, glycol, ammonia, propane, or water that is used to cool the process fluid.

"Process fluid" refers to a liquid or gas that is treated by interaction with the working fluid. For example, in an air conditioner system, the process fluid is the air that is cooled.

"Sensible heat" refers to a change in temperature of a gas or object with no change in phase.

"Sensible heat ratio" refers to the ratio of the sensible cooling capacity to the total cooling capacity.

"Control system" or "controller," used interchangeably herein, refers to a device controlling logic, machine code, designs, concepts, configuration and/or supporting hardware.

"Relative humidity" refers to the amount of water vapor present in air expressed as a percentage of the amount needed for saturation at the same temperature.

"Air-side" in reference to a heat exchanger refers to the surfaces adjacent to and regions concomitant with the process fluid, for example, air to be cooled.

"Air side heat transfer rate" refers to the amount of heat transferred from the process fluid to the primary evaporator device.

"Tube-side" in reference to a heat exchanger refers to the surfaces adjacent to the working fluid, for example, refrigerant.

"Condensate rejection rate" refers to the amount of condensate condensed from the air stream and removed from the primary heat transfer surfaces per unit time.

"Jumping droplet condensation" or "droplet ejection" refers to condensate formed on the primary heat transfer surfaces wherein the droplet leaves the surface with some velocity out of plane of the primary heat transfer surface (as opposed to rolling along the surface, finding an edge and separating). Often, but not necessarily, the droplets are being subjected to an external force (drag, vibration, coalescence, gravity, etc.).

"Throughput" refers to the amount of a product or commodity that may be chilled or frozen per unit time (e.g., pounds per day).

Controller

Figure 3:
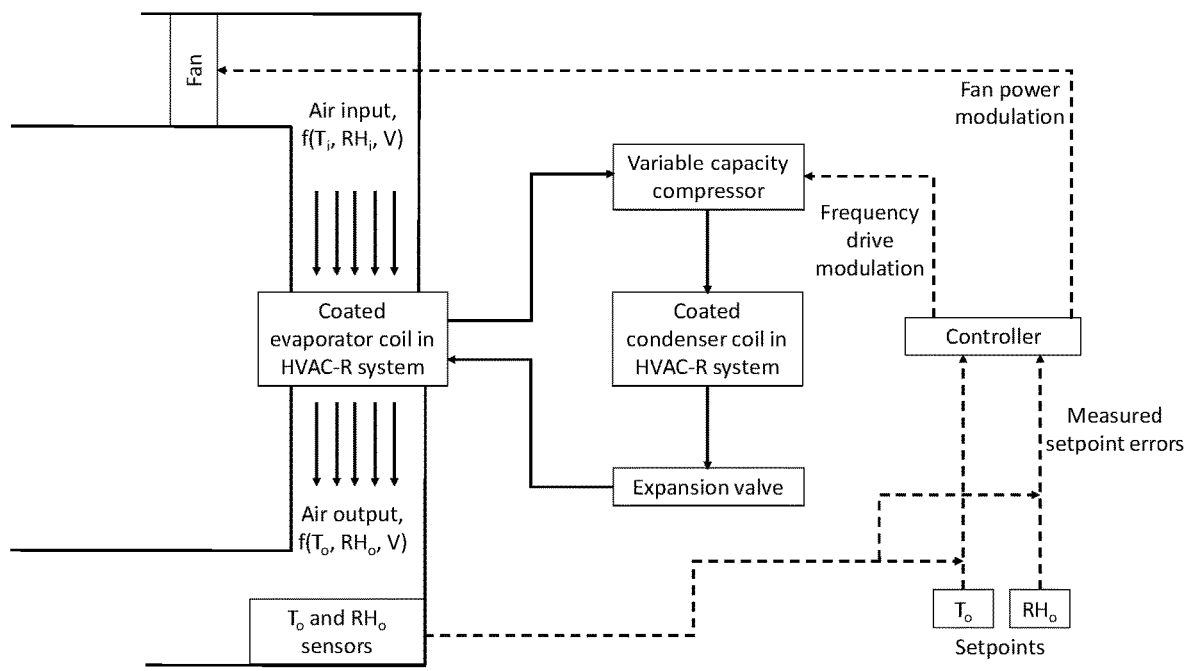
FIG. 3 depicts interaction of a controller as described herein within an HVAC-R system.
Figure 4:
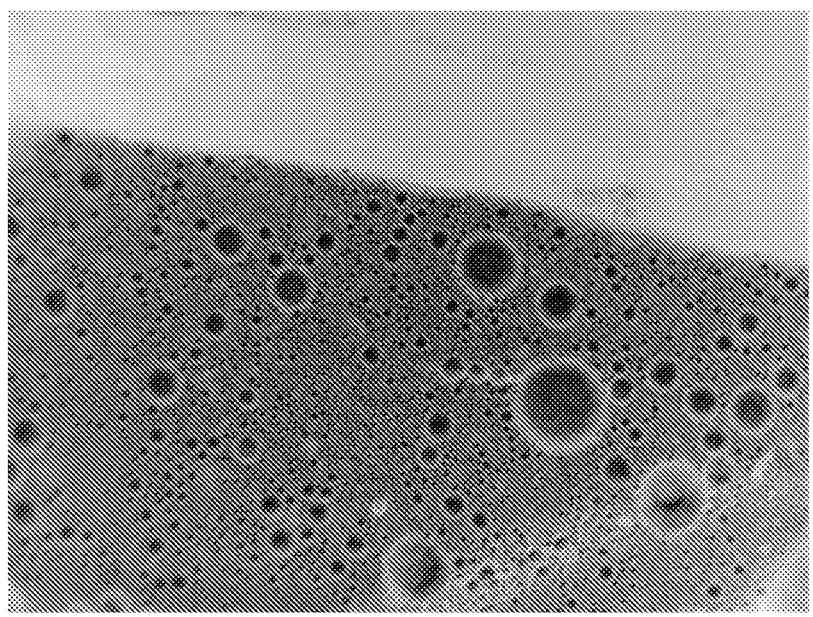
FIG. 4 shows a 9 mm wide field image. The nanostructured surface is located on the bottom portion of the figure. Liquid droplets of varying size can be seen. The white area to the top is the background, uncoated substrate which readily shows frost formation. The operating velocity for this image is above the critical velocity for frost formation.

A diagram indicating a non-limiting example of how a controller as described herein may interface within an HVAC-R system is shown in FIG. 3. In this case the controller is operating as a negative feedback controller wherein the input temperature and humidity setpoints are subtracted from the sensor readings of the air output. This differential error of the setpoint is reduced by the controller modulating the air speed to increase or decrease the effect of droplet ejection, and thus latent degradation. For example, in some embodiments, the controller may operate the air speed at about 300 feet per minute (fpm) for a portion, e.g., a majority, of the time, and increase the velocity to about 600 fpm to about 800 fpm or about 1000 fpm to remove frost formation, then return to about 300 fpm. The air speed can be modulated by changing the fan speed. Additionally, the compressor capacity is controlled by changing the frequency of a variable frequency drive. The benefits of this control system with droplet ejection coatings on the coils is decoupled output air temperature and humidity and more efficient operation.

Systems described herein (e.g., nanostructured coated heat exchangers) may be used within existing controller systems, such as a variable refrigerant flow system, to control the tube side HVAC conditions. In some embodiments, variable refrigerant control can be achieved via variable refrigerant compressor speed or variable pressure drop through expansion valve control.

Figure 5:
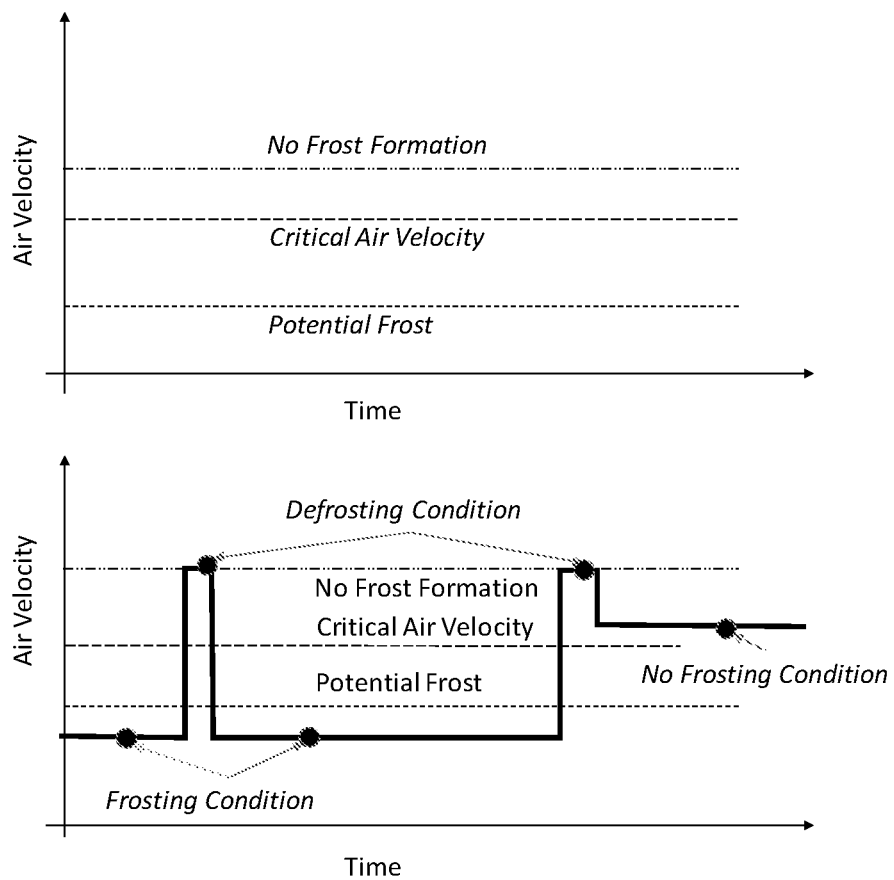
FIG. 5 shows operating regimes for air velocity that can be used as part of a control algorithm to avoid or minimize frost formation.

Refrigeration systems herein may be controlled to operate within a frost free region to prevent the requirement for defrost. This operating range may be determined through the generation of an inlet humidity, temperature and velocity plot such as that shown in FIG. 7. Systems may be monitored for refrigerant pressure temperature and mass flow. Systems may be monitored for inlet air humidity, temperature and velocity. Systems may be monitored for combinations of parameters therein. Air velocity and refrigerant mass flow may be controlled through valves and/or programmable fan motors or other means known to those skilled in the art. As an example, an algorithm may be developed and employed to control the speed of a fan wherein the result is avoidance or modulation of frost formation. Examples of operating regimes and control algorithms for the control of frost are provided in FIGS. 5 and 6.

Droplet Ejecting Coatings

In some embodiments of the temperature and relative humidity control systems described herein, droplet ejecting coating materials are provided that eject condensed droplets of liquid from the surface of a substrate, e.g., a surface of a heat exchanger, e.g., in an HVAC system. In some embodiments, a droplet ejecting coating material includes a nanostructured material deposited on a substrate, and optionally, a hydrophobic material deposited on the nanostructured material. The nanostructured material includes a geometry that provides a driving force for droplet ejection from the surface. The geometry may include, but is not limited to, a nanostructure that causes the droplets to take a distorted shape upon condensation.

Droplet ejecting coating materials may include a surface that is textured such that condensed droplets are ejected when the surface tension force exceeds the droplet adhesion forces, thereby resulting in a net force vector that has a component out of the plane of the substrate.

The coating materials disclosed herein may eject condensed fluid from the surface in the presence of one or more non-condensing gases (NCGs). For example, the coating materials may eject fluid in the presence of air, gas components of air, or inert gases. In some embodiments, the NCG is selected from air, nitrogen, oxygen, carbon dioxide, hydrogen, helium, argon, or a combination thereof. In some embodiments, the NCG is selected from air, oxygen, nitrogen, carbon dioxide, argon, or a combination thereof. In one embodiment, the NCG is air.

The coating materials disclosed herein may eject condensed fluid from the surface at supersaturation greater than about 1.0, about 1.1, about 1.2, or about 1.25, or at supersaturation about 1.0 to about 1.1, about 1.1 to about 1.25, about 1.1 to about 3.0, or about 1.1 to 5.0.

Condensed fluid droplets that may be ejected by the coating materials disclosed herein include, but are not limited to, water, ethanol, and refrigerants. In some embodiments, the condensed fluid is selected from water, ethanol, a hydrofluorocarbon (HFC), and a hydrofluoro-olefin (HFO), or a combination thereof. In some embodiments, the condensed fluid is selected from water, ethanol, difluoromethane (HFC-32), difluoroethane (HFc-152a), pentafluoroethane (HFC-125), 2,3,3,3-tetrafluoropropene (HCO-1234yf), 1,3,3,3-tetrafluoropropene (HFO1234ze), or a combination thereof. In one embodiment, the condensed fluid is water. In some embodiments, the condensed fluid is an industrial process or working fluid.

Droplet ejecting coating materials as described herein may eject condensed fluid droplets from the surface having an average diameter of less than about 2 millimeters, less than about 1 millimeter, or less than about 500 micrometers.

In some embodiments, the nanostructured coating layer includes nanostructured metal, ceramic, glass, or polymer.

In some embodiments, the nanostructured coating layer includes a ceramic that is a metal oxide. The metal oxide may be, for example, a transition metal oxide, tin(IV) oxide, magnesium oxide or aluminum oxide. In some embodiments, the transition metal oxide is selected from zinc oxide, iron(II, III) oxide($Fe_3O_4$), iron(III) oxide ($Fe_2O_3$), manganese(IV) oxide ($MnO_2$), manganese(II, III) oxide ($Mn_3O_4$), manganese(III) oxide ($Mn_2O_3$), nickel(II) oxide (NiO), nickel(III) oxide ($Ni_2O_3$), zirconium(IV) oxide ($ZrO_2$), titanium(IV) oxide (TiO2), chromium(III) oxide ($Cr_2O_3$), copper(II) oxide (CuO), cobalt(II) oxide (CoO), cobalt(III) oxide ($Co_2O_3$), and cobalt(II, III) oxide ($Co_3O_4$).

In some embodiments, the nanostructured coating layer includes a glass. In some examples, the glass includes silica or a silicate.

In some embodiments, the nanostructured coating layer includes a polymer. In some examples, the polymer is a fluoropolymer, polyethylene, or polypropylene. In some embodiments, the polymer is a fluoropolymer selected from polytetrafluoroethylene (PTFE), polyvinylidene (PVDF), polyvinylfluoride (PVF), and fluorinated ethylene propylene (FEP), or a combination thereof. In some embodiments, the polymer is a block copolymer, for example, but not limited to, wherein each block of the copolymer is less than about 500 monomer units, or less than about 200 monomer units. For example, the block copolymer may be a hydrophobic polymer that includes two or more monomer units. In some embodiments, the block co-polymer may include one or more monomers, such as, but not limited to, propylene, ethylene, tetrafluoroethylene, trifluoroethylene, vinylfluoride, hexafluoropropoylene, 1,1-difluoroethylene, 1,2-difluoroethylene, and isobutylene.

In some embodiments, a hydrophobic coating layer may include one or more hydrophobic functionality selected from alkyl, vinyl, phenyl, and fluoroalkyl. For example, the hydrophobic functionality may include, but is not limited to, alkylsilane, vinylsilane, phenylsilane, or fluoroalkylsilane. In certain nonlimiting embodiments, the hydrophobic functionality is hexamethyldisilazine, sodium methylsiliconate, potassium methylsiliconate, dimethiconol, perfluorooctyltriethoxysilane, perfluorodecyltriethoxysilane, perfluorooctyltrimethoxysilane, perfluorodecyltrimethoxysilane, octadecy ltriethoxysilane, methyltrimethoxysilane, methyltriethoxysilane, isobutyltrimethoxysilane, isobutyltriethoxysilane, or phenyltriethoxysilane. In some embodiments, the hydrophobic coating refers to a coating that when added to a smooth substrate, imparts a contact angle greater than or equal to 90 degrees.

Methods of Making Droplet Ejection Coatings

Methods of making coatings that eject droplets of condensed liquid from a substrate, e.g., under condensing conditions, are provided. In certain non-limiting embodiments, the methods include: (a) depositing a nanostructured coating layer on a substrate: and optionally (b) depositing a hydrophobic functional layer, i.e., a hydrophobic material that includes one or more hydrophobic functional groups, on the surface of the nanostructured material.

The nanostructured layer may be deposited on the substrate by any suitable means, including but not limited to, sol get processing, chemical bath deposition, dip coating, spray coating, physical vapor deposition, or chemical vapor deposition. In one embodiment, the nanostructured coating is a metal oxide that is deposited by, for example, sol gel processing, chemical bath deposition, or dip coating. The hydrophobic functional layer may be deposited onto the nanostructured layer by any suitable means, including but not limited to, vapor deposition or dip coating.

Nonlimiting examples of nanostructured and hydrophobic coating materials are described above. The substrate may include a metal, metal alloy, glass, or ceramic material.

In some embodiments, the substrate is pretreated prior to deposition of a coating composition, e.g., a nanostructure coating layer as described herein, to remove debris or substance(s) on the surface and/or to smooth the surface (i.e., to access the substrate to promote adhesion and to prevent defects), with one or more treatment(s) selected from cleaning, degreasing, rinsing, etching, desmutting, oxidizing, removing previous treatments, roughening, planarizing, steam cleaning, thermal oxidation, and smoothing.

The following examples are intended to illustrate, but not limit, the invention.

EXAMPLES

Example 1

In a hot and dry environment, 37° C., 20% relative humidity (RH) for example, a controller as described herein operates in a conventional cooling mode at face velocities such as 0 to about 3 m/s, for example, about 1.5 m/s and cools the air sensibly to the desired comfortable range. Alternatively, if the operator desires a higher relative humidity and lower power consumption or the controller is programmed to minimize energy consumption, the face velocity is increased to about 1 to about 20 m/s, for example, about 3.0 m/s which will cause a greater droplet ejection rate, increasing the revaporization rate. This increases the humidity and decreases the temperature. The controller enables the HVAC system to operate as a conventional forced air coil and evaporative cooler, simultaneously.

FIG. 1 shows the cooling paths on a psychrometric chart. A controller enabled cooling path (1→2→4) is shown versus the conventional cooling (1→2→3) path, when the operator desires higher humidity. The cooling unit operates conventionally and the controller turns on at point 2 and increases the fan speed to raise the humidity, providing additional cooling capacity due to latent degradation, and increasing the overall efficiency of the unit to achieve conditions in the comfort region. This controlled latent degradation route allows simultaneous evaporative cooling and forced air cooling, reducing the energy usage by more than 50%.

Example 2

Figure 2:
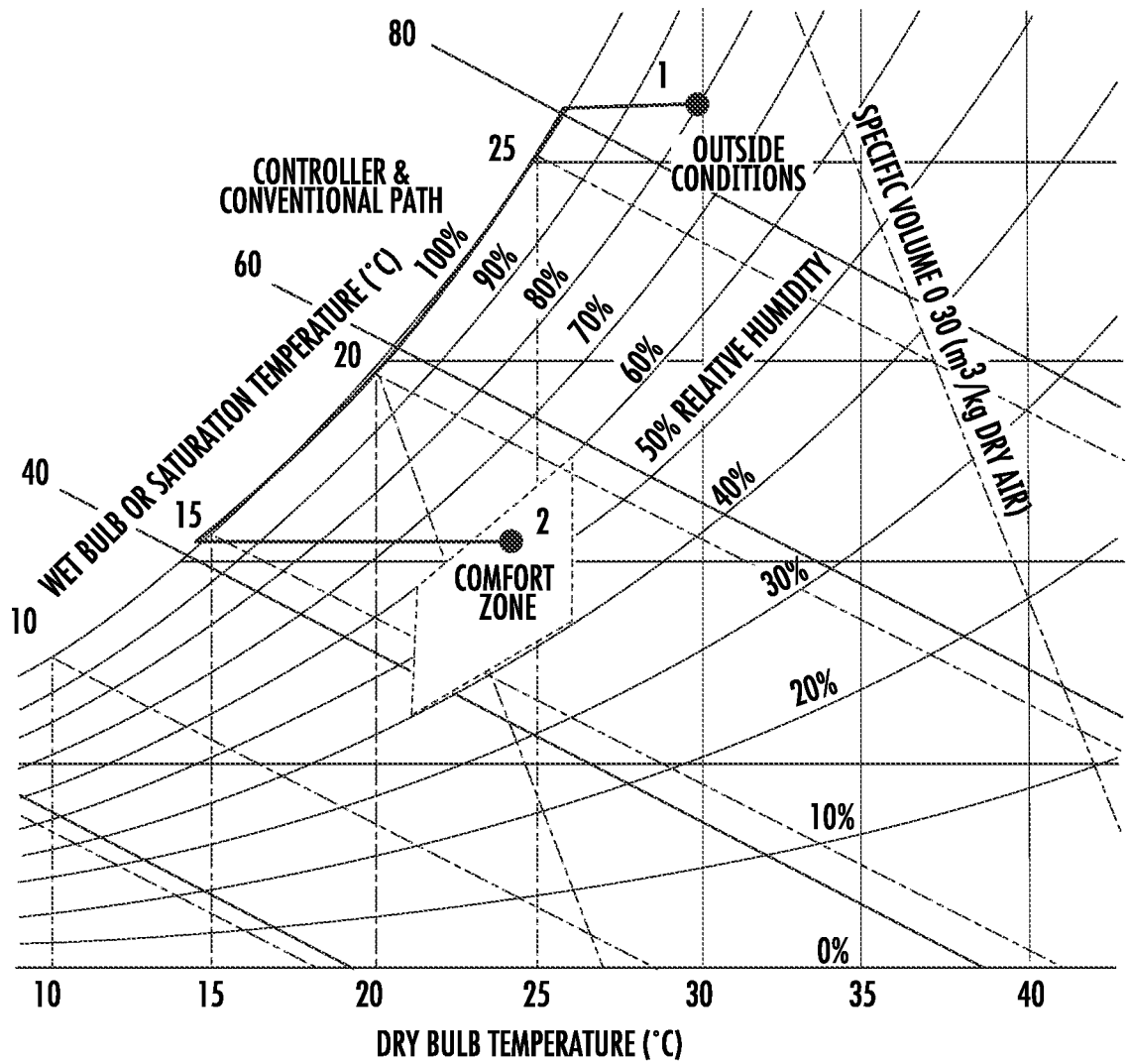
FIG. 2 depicts controller and convention cooling path in an HVAC-R system under hot and humid outdoor conditions.

A controller as described herein advantageously operates in hot and humid environments, for example, under outdoor conditions of 30° C. and 80% RH. The high humidity environment cannot use any additional latent degradation. The controller therefore allows the unit to cool using the conventional operating route to minimize energy usage for the desired setpoint. This cooling path is plotted in FIG. 2.

In a hot and humid environment, the controller does not increase the fan speed and follows the conventional cooling path. In this case, this is the most energetically efficient route to cool due to the low sensible heat ratio. The controller is programmed to acknowledge this to operate the unit as efficiently as possible.

Example 3

Figure 6:
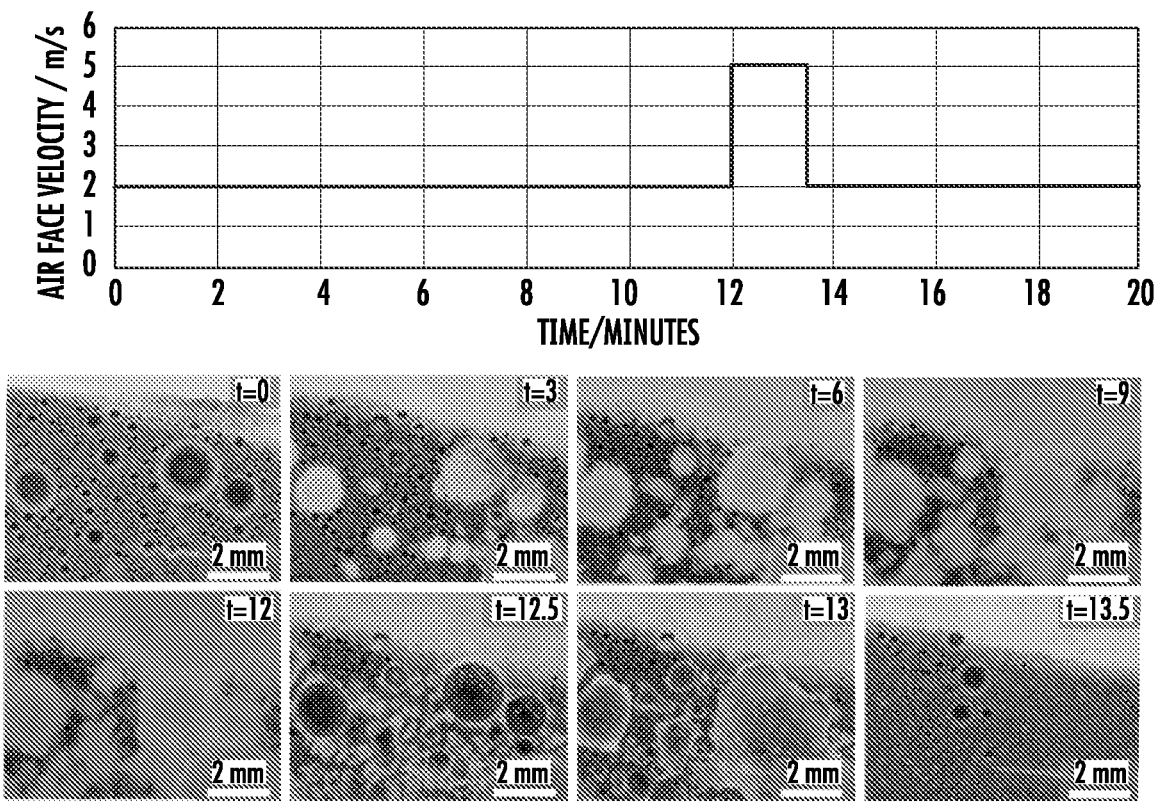
FIG. 6 shows a sample under conditions leading to frost formation (t=0-12 minutes) and defrosting (12-13.5 min). Velocity profiles for these test configurations are shown in the top portion of the figure.
Figure 7:
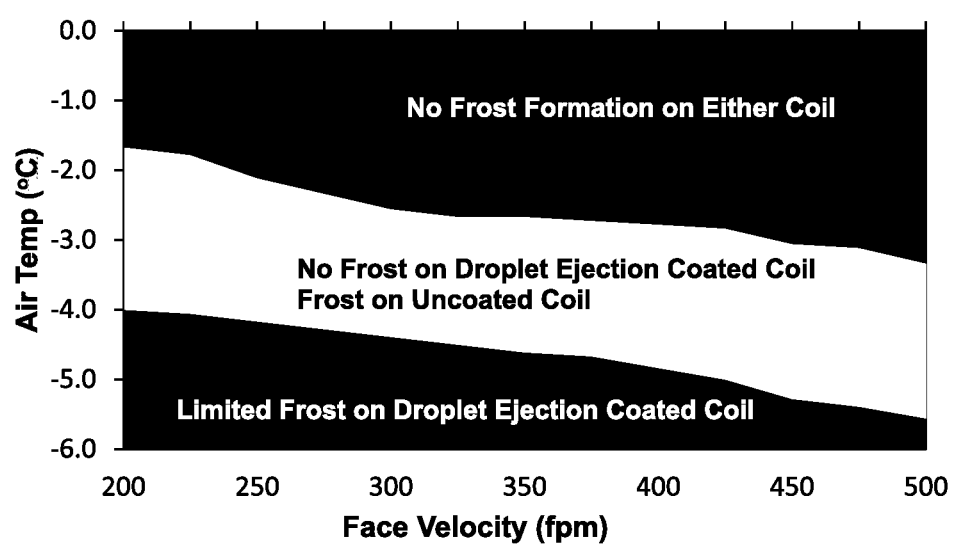
FIG. 7 shows the observations of the onset of frost on droplet ejection coated coils and uncoated coils for saturated air as a function of inlet air velocity and temperature. In this figure the inlet air is saturated, but similar plots may be generated as a function of inlet relative humidity.

An aluminum plate, with a nanostructured coating applied as described herein, approximately 30 mm by 40 mm, was placed into a wind tunnel and mounted to a cold plate with estimated temperature of −15° C. Uncoated aluminum located adjacent to the plate was covered with frost. Airflow conditions were ~20° ° C., 60% RH. The flow velocity across the plate was approximately 5 m/s. These conditions were maintained for over 1 hr. Frost was observed on uncoated sections, whereas the nanostructure coated materials only showed condensation. After steady state conditions were observed, the flow velocity was reduced to 2 m/s. After a few minutes, freezing of droplets and frost formation were observed on both the nanostructure coated sample and the uncoated materials. After a period of 12 minutes, the velocity was returned to 5 m/s and on the frosted surface, melting of ice and frost was noted. In approximately 90 seconds, the previously observed steady state conditions were reestablished. Results are shown in FIG. 6.

Example 4

A fin and tube heat exchanger, with surface modified fins that contain a surface material that promotes droplet ejection, was placed in a controlled cooling environment wherein the inlet air conditions including humidity and temperature were controlled.

This system used a recirculating chiller on the tube side filled with a glycol-water mixture. This water side loop was measured for inlet temperature, outlet temperature, and coolant flow. These measurements allowed for the calculation of the heat transferred into the refrigerant.

The air flowing across the heat exchanger was also measured for inlet temperature, outlet temperature, inlet relative humidity, outlet relative humidity, and volumetric flow. These measurements were used to calculate the amount of energy removed from the air as it crossed the heat exchanger.

One coil with droplet ejection coating was tested. Another coil with no droplet ejection was tested in a similar manner. The coils were subjected to inlet air velocities of 200 to 500 feet per minute. Inlet air was saturated with water (RH 100%) and inlet air temperature was varied from 0 to 6° ° C. below freezing. In these tests, the coolant flow was set to ensure minimum differences between the inlet air and coolant temperature. The coils were visually observed for the onset of frost formation.

The surfaces with droplet ejection coating required lower inlet temperatures to observe frost formation than those surfaces without droplet ejection coating. The degree of frost onset depression is a function of air velocity, ranging from about −4° C. below at low velocity to about −6° C. at high velocities. The velocity ranges correspond to typical HVAC conditions, but the mechanism shall apply to a wider range of velocities. An uncoated coil showed the onset of frost at about −1.5° C. at low velocity to about −3° C. at high velocity. These results are shown graphically as FIG. 7.

Example 5

Large blast chillers bring in a large amounts of produce to chill/freeze. Current systems are capable of freezing product at a rate of 10,000 pounds (lbs) of product per day. This limit may be set by the amount of time required to defrost the cooling coils. As an example, the cooling coils may operate for 11 hours and require a 1 hour defrost cycle. Operation with droplet ejection coatings and embodiments of operating conditions described herein provide continuous operation without the need for defrosting. This results in the ability to process about 11,000 lbs/day of product—a 10% increase in facility throughput.

Although the foregoing invention has been described in some detail by way of illustration and examples for purposes of clarity of understanding, it will be apparent to those skilled in the art that certain changes and modifications may be practiced without departing from the spirit and scope of the invention. Therefore, the description should not be construed as limiting the scope of the invention, which is delineated in the appended claims.

All publications, patents, and patent applications cited herein are hereby incorporated by reference in their entireties for all purposes and to the same extent as if each individual publication, patent, or patent application were specifically and individually indicated to be so incorporated by reference.

The invention claimed is:

1. A refrigeration system comprising a cooling operating mode, wherein said system comprises a droplet ejection coating applied to external surfaces of evaporating coils, wherein the droplet ejection coating comprises a nanostructured composition or layer that consists essentially of a metal, a ceramic, or a glass and a hydrophobic functional layer deposited onto the nanostructured composition or layer, wherein in said cooling operating mode, a temperature on the external surfaces of the evaporating coils is maintained below the freezing point of water with an air velocity that is greater than a critical air velocity that prevents formation of frost, wherein the system further comprises a freezing operating mode that operates in alternation with the cooling operation mode, wherein a system controller operates for a portion of time at an air velocity that is below the critical air velocity, and wherein the system controller increases the air velocity to above the critical air velocity for the removal of frost.

2. A refrigeration system according to claim 1, wherein the temperature on the external surfaces of the evaporating coils is maintained by more than 1° C. below the freezing point of water.

3. A refrigeration system according to claim 1, wherein the coil temperature on the external surfaces of the evaporating coils is maintained by more than 5° C. below the freezing point of water.

4. A refrigeration system according to claim 1, wherein the coil temperature on the external surfaces of the evaporating coils is maintained by more than 10° C. below the freezing point of water.

5. A refrigeration system according to claim 1, wherein said system further comprises a freezing operating mode that operates in alternation with said cooling operation mode, wherein air in said system is dehumidified and system throughput is increased in comparison to a system that does not comprise a droplet ejection coating.

6. A refrigeration system according to claim 1, wherein the droplet ejecting coating comprises a surface that is textured such that condensed droplets are ejected when a droplet surface tension force exceeds a droplet adhesion force, thereby resulting in a net force vector that has a component out of a plane of the surface of an evaporating coil.

7. A refrigeration system according to claim 1, wherein the nanostructured composition or layer consists essentially of a ceramic.

8. A refrigeration system according to claim 1, wherein the ceramic comprises a metal oxide selected from a transition metal oxide, tin (IV) oxide, magnesium oxide, and aluminum oxide.

9. A refrigeration system according to claim 8, wherein the ceramic comprises a transition metal oxide selected from zinc oxide, iron (II, III) oxide ($Fe_3O4$), iron (III) oxide ($Fe_2O_3$), manganese (IV) oxide ($MnO_2$), manganese (II, III) oxide ($Mn_3O_4$), manganese (III) oxide ($Mn_2O_3$), nickel (II) oxide (NiO), nickel (III) oxide ($Ni_2O_3$), zirconium (IV) oxide ($ZrO_2$), titanium (IV) oxide ($TiO_2$), chromium (III) oxide ($Cr_2O_3$), copper (II) oxide (CuO), cobalt (II) oxide (CoO), cobalt (III) oxide ($Co_2O_3$), and cobalt (II, III) oxide ($Co_3O_4$).

10. A refrigeration system according to claim 1, wherein the nanostructured composition or layer consists essentially of a glass selected from silica and a silicate.

11. A refrigeration system according to claim 1, wherein the hydrophobic functional layer comprises a material that comprises one or more hydrophobic functionality selected from alkyl, vinyl, phenyl, and fluoroalkyl.

12. A refrigeration system according to claim 11, wherein the hydrophobic functional layer comprises alkylsilane, vinylsilane, phenylsilane, or fluoroalkylsilane.

13. A refrigeration system according to claim 1, wherein the hydrophobic functional layer comprises hexamethyldisilazine, sodium methylsiliconate, potassium methylsiliconate, dimethiconol, perfluorooctyltriethoxysilane, perfluorodecyltriethoxysilane, perfluorooctyltrimethoxysilane, perfluorodecyltrimethoxysilane, octadecyltriethoxysilane, methyltrimethoxysilane, methyltriethoxysilane, isobutyltrimethoxysilane, isobutyltriethoxysilane, or phenyltriethoxysilane.

* * * * *